United States Patent [19]

Sisson et al.

[11] Patent Number: 4,525,911

[45] Date of Patent: Jul. 2, 1985

[54] METHOD AND APPARATUS FOR ATTACHING BLADES TO ROTATING STRUCTURES

[75] Inventors: Steve S. Sisson, Seattle; Olivier L. Tremoulet, Jr., Edmonds; John E. Mercer, Kent, all of Wash.

[73] Assignee: FloWind R & D Partnership, Kent, Wash.

[21] Appl. No.: 487,854

[22] Filed: Apr. 22, 1983

[51] Int. Cl.³ .............................................. B23P 15/02
[52] U.S. Cl. ........................ 29/156.8 R; 24/241 SL; 29/526 R; 403/300; 403/301; 403/306; 403/310; 416/132 B; 416/227 A
[58] Field of Search ................. 29/156.8 R, 156.8 CF, 29/526 R, 156.8 P, 156.8 T; 403/300, 301, 306, 310; 416/132 B, 226, 227 A, 244 R, 248; 24/241 SL

[56] References Cited

U.S. PATENT DOCUMENTS

| | | | |
|---|---|---|---|
| 1,509,957 | 9/1924 | Krueger | 416/227 A |
| 1,875,454 | 9/1932 | Havil | 29/156.8 P |
| 2,183,158 | 12/1939 | Bennett | 29/156.8 T |
| 2,568,230 | 9/1951 | Gluhareff | 416/226 X |
| 2,949,967 | 8/1960 | Jokanovich | 416/141 |
| 2,951,541 | 9/1960 | Hinds | 416/226 X |
| 3,330,362 | 7/1967 | Kastan | 416/226 X |
| 4,148,594 | 4/1974 | Stafford | 416/214 R |
| 4,364,708 | 12/1982 | David | 416/132 B |

FOREIGN PATENT DOCUMENTS 909617 10/1962 United Kingdom ............... 416/226

*Primary Examiner*—Charlie T. Moon
*Assistant Examiner*—Ronald S. Wallace
*Attorney, Agent, or Firm*—Don R. Mollick; Gregory W. Moravan

[57] ABSTRACT

A method and apparatus for attaching blades to a rotating structure where the blades are clamped by blocks at the leading and trailing edges then to an intermediary member which is attached to the rotating structure.

16 Claims, 4 Drawing Figures

METHOD AND APPARATUS FOR ATTACHING BLADES TO ROTATING STRUCTURES

FIELD OF INVENTION

This invention pertains to attachment means, particularly means for attaching radially spaced members to an intermediate member, more particularly to rotating structures using such attachment means.

DESCRIPTION OF FIELD

The forces that are exerted upon a blade in a fluid reaction surface are of a type unusual to those normally encountered in joining systems. The structure must withstand the static forces due to weight of the members and the dynamic forces caused by the members rotation and air resistance. In addition there are forces caused by variations in air velocity and direction which make such structures particularly susceptible to metal fatigue.

A particular application of such structures is the attachment of propeller blades to a windmill. One particular type of windmill where this attachment has been a problem is the vertical turbine type of windmill. In this type of windmill a plurality of blades are attached at their tops and bottoms to a central shaft in a manner resembling that of an eggbeater blade. The blades are commonly large aluminum extrusions with a hollow center to reduce weight.

It has been proposed to weld the blades to the tangs of a thrust plate that is attached to the vertical shaft. This method is successful but over long periods of use leads to stress cracks at the point of attachment of the blades to the plate. Accordingly a need has arose for a simple means of attaching blades to a rotating structure.

SUMMARY OF THE INVENTION

The invention provides an economical simple means of attaching blades to a rotating shaft. The invention includes a thrust plate at either end of the shaft. Each thrust plate is provided with a tang for each blade. Each tang has two clamp blocks associated with it. The first clamp block includes a surface that conforms in shape to that of the leading edge of the blade and a second surface that conforms to the shape of the tang. The second clamp block includes a surface that conforms to the shape of the trailing edge of the blade and a surface that conforms to the shape of the tang. Blade inserts are associated with each clamp block. The blade inserts are attached to the clamp blocks by means of bolts or equivalent passing through the blade. The result is that when the bolts are tightened the blade is securely clamped between the clamp blocks and the inserts. The clamp blocks are attached to the tangs by bolts or equivalent. Due to the joint thus created the possibility of metal fatigue is greatly reduced.

DESCRIPTION OF THE PREFERRED EMBODIMENT

Figure 1:
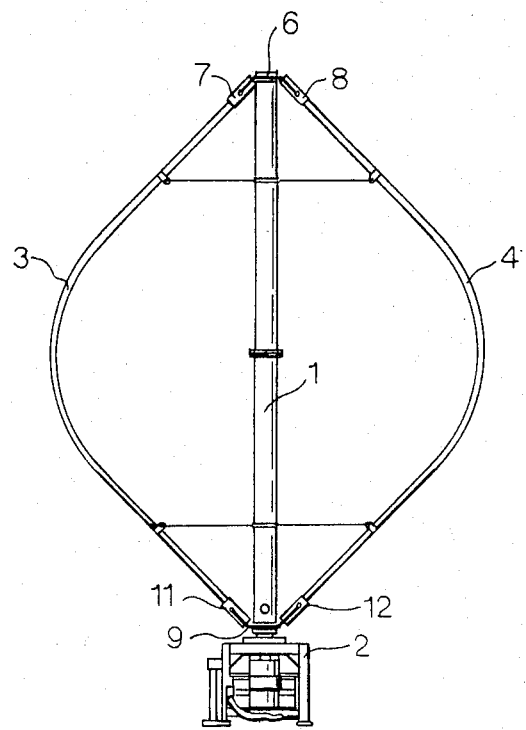
FIG. 1 is an elevation view of a windmill incorporating the invention.

FIG. 1 is an elevation view of a windmill utilizing the invention. The windmill includes a vertical shaft 1 rotatively attached to a platform 2. A first blade 3 and a second blade 4 are attached to shaft 1. Blades 3 and 4 are large hollow aluminum extrusions having a rounded leading edge and a pointed trailing edge. The blades 3 and 4 are attached to a plate 6 at the upper end of shaft 1 by means of blocks 7 and 8. A similar plate 9 is mounted to the lower end of shaft 1 attaching to the lower ends of blades 3 and 4 by means of blocks 11 and 12.

Figure 2:
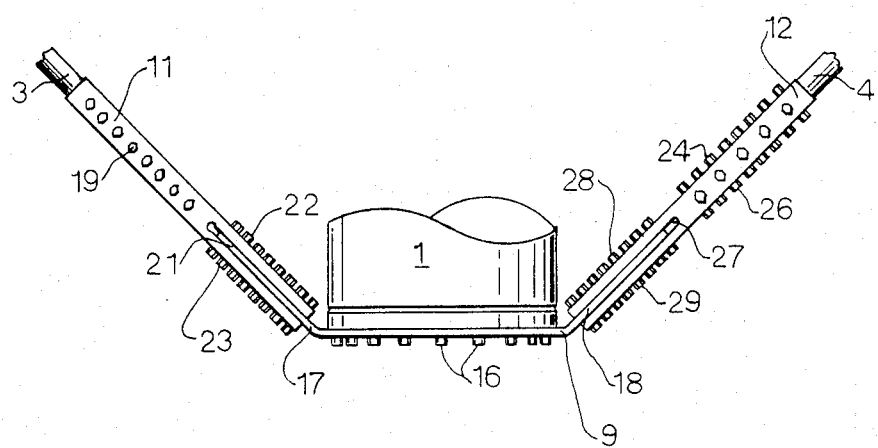
FIG. 2 is a front elevation view of the invention.

FIG. 2 is a front elevation detail view of the attachment of blades to the shaft. It should be noted that the attachment on the top of the shaft 1 is identical. Similarly a rear elevation view would be identical to FIG. 2. Plate 9 is mounted to the lower end of shaft 1 by a plurality of bolts 16. Alternate methods of mounting plate 9 to shaft 1 are possible such as welding. In the embodiment illustrated bolts 16 mounted in a circle pass through holes in plate 9 to attach to shaft 1. Plate 9 is circular with two attached tangs 17, 18 which are upwardly inclined at an angle 0. Block 11 clamps onto the leading edge of blade 3 and is secured by bolts 19. Block 11 also includes a slot 21 for receiving tang 17 of plate 9. Tang 17 is retained in slot 21 by bolts 22 which pass through holes in block 11 and tang 17 and are retained by nuts 23. Similarly blade 4 is attached to block 12 which encloses its trailing edge by bolts 24 and nuts 26 which pass through holes in blade 4 and block 12. Block 12 also includes a slot 27 which receives tang 18 at plate 9 and is secured by bolts 28 passing through holds in block 12 and tang 18. Bolts 28 are retained by nuts 29. It should be noted that similar blocks (not shown) secure the trailing edge of blade 3 to tang 17 and the leading edge of blade 4 to tang 18.

Figure 3:
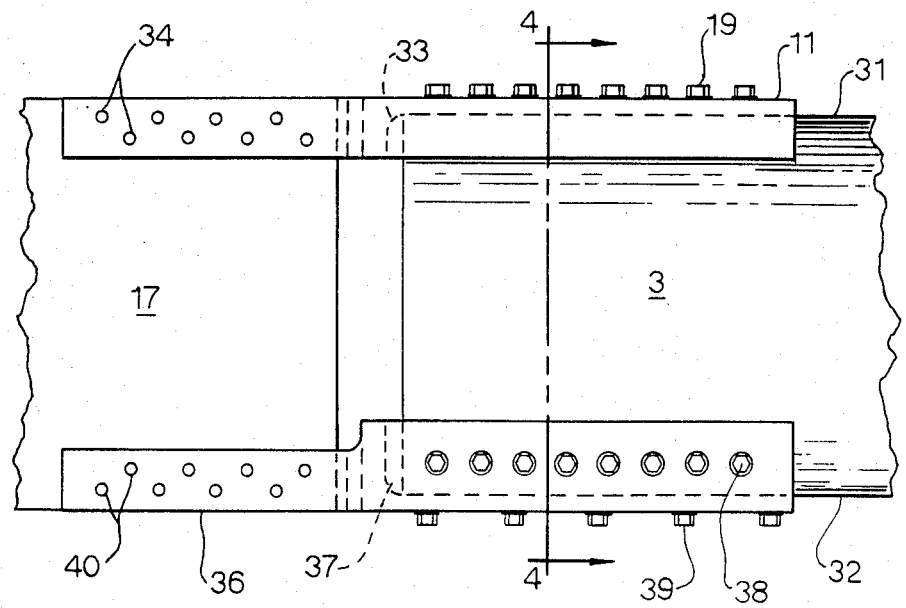
FIG. 3 is a top plan view of the invention.

FIG. 3 is a top plan view of the attachment of a blade to a plate. A blade 3 has a leading edge 31 and a trailing edge 32. Block 11 includes a recess 33 for receiving leading edge 31 of blade 3. Blade 3 is retained in recess 33 by a plurality of bolts 19 which pass through holes in block 11 and leading edge 31 of blade 3. Bolts 19 are threaded into an insert (not shown) in the hollow interior of blade 3. Block 11 also includes a series of holes 34. Holes 34 match holes in tang 17 for attachment as described in FIG. 2. A second block 36 includes a recess 37 for receiving trailing edge 32 of blade 3. A series of bolts 38 passing through holes in block 36 and blade 3 press block 36 around blade 3 and a second series of bolts 39 passing through holes in block 36 and trailing edge 32 retain blade 3 in recess 37. A third series of holes 40 pierce block 36 and align with holes in tang 17 to clamp tang 17 in block 36.

Figure 4:
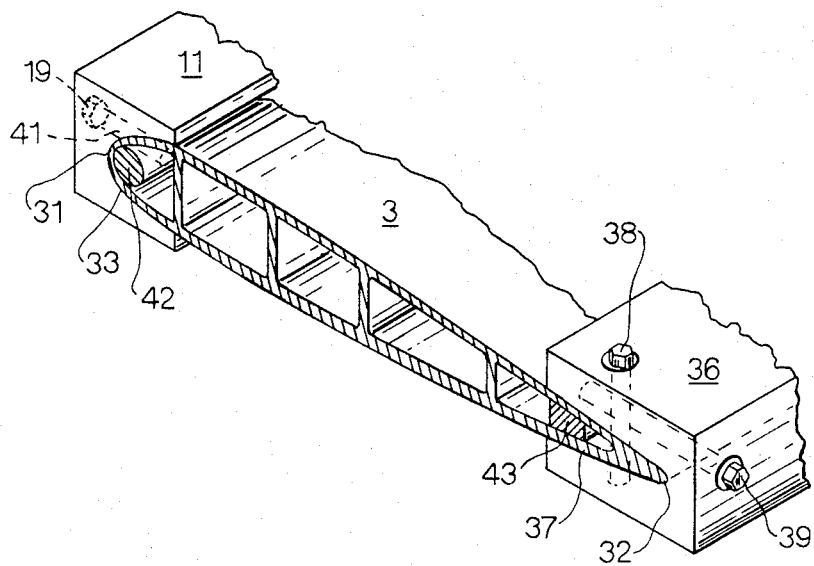
FIG. 4 is an isometric section view of the FIG. 3 embodiment.

FIG. 4 is an isometric section view of the FIG. 3 embodiment. Blade 3 having leading edge 31 is clamped into recess 33 of block 11. Bolts 19 pass through holes 41 in block 11 and holes in leading edge 31 to attach to an insert 42. Insert 42 is a round bar with a diameter chosen to match the interior dimensions of blade 3 in the vicinity of leading edge 31. Insert 42 could be semi-circular or oval and perform the same function. Insert 42 includes a series of threaded holes to retain bolts 19. Recess 33 is seen to closely conform to the outside dimension of blade 3 in the vicinity of leading edge 31. Tightening bolts 19 clamps blade 3 between recess 31 and insert 42. Block 36 includes holes for passing bolts 38 which also pierce blade 3. Tightening bolts 38 clamps block 36 onto blade 3. Block 36 also includes holes for passing a second series of bolts 39 which pass through trailing edge 32 into threaded holes in a new block insert 43. Tightening bolts 39 pulls insert 43 toward trailing edge 32 and thus secures blade 3 in recess 37. Insert 43 also serves the purpose of resisting the clamping force from bolts 38.

The examples shown above are explaining only the invention being defined by the attached claims.

I claim:

1. A method for attaching a blade having a leading edge and a trailing edge to a shaft comprising the steps of:
   clamping a first member onto the trailing edge of the blade, and
   clamping a second member onto the leading edge of the blade, and
   attaching said first member and said second member to the shaft.

2. A method as in claim 1, wherein the blade is hollow and further comprising the steps of:
   inserting a third member into the interior of said hollow blade, and
   connecting said third member to said first member.

3. A method as in claim 2 wherein said connecting step is further comprising the steps of:
   passing connectors through said first member, the trailing edge of said blade and the third member, and
   tightening said connectors.

4. A method as in claim 1, wherein the blade is hollow and further comprising the steps of:
   inserting a third member into the interior of said hollow blade, and
   connecting said third member to said second member.

5. A method as in claim 4, wherein said connecting step is further comprising the steps of:
   passing connectors through said second member the leading edge of said blade and said third member, and
   tightening said connectors.

6. A method as in claim 4, further comprising the steps of:
   inserting a fourth member into the interior of said blade, and
   connecting said fourth member to said first member.

7. A method as in claim 6, wherein said connecting steps are further comprising the steps of:
   passing connectors through said first and second members, the leading and trailing edges of said blade and into said third and fourth members, and
   tightening said connectors.

8. An apparatus for attaching a blade having a leading and a trailing edge to a shaft comprising:
   clamping means adapted for attachment to the leading edge of said blade, and
   further clamping means adapted for attachment to the trailing edge of said blade, and
   attachment members for attaching said clamping means and said further clamping means to the shaft.

9. An apparatus as in claim 8 wherein said clamping means includes a surface shaped to conform to the surface of the blade in the vicinity of the leading edge.

10. An apparatus as in claim 8, wherein said further clamping means includes a surface shaped to conform to the surface of the blade in the vicinity of the trailing edge.

11. An apparatus as in claim 9, wherein said clamping means includes a second surface shaped to conform to the shape of said attachment (means) members; and a connecting means for connecting said attachment (means) members to said clamping means.

12. An apparatus as in claim 11, wherein said connecting means is comprising a series of bolts and associated nuts.

13. An apparatus as in claim 8, wherein said attachment means is a plate having a tang for each blade.

14. An apparatus as in claim 9 further including an insert for inserting into said blade and connecting means for connecting the insert to said clamping means.

15. An apparatus as in claim 14, wherein said connecting means includes a series of bolts.

16. An apparatus for attaching a hollow blade having a leading and a trailing edge to a shaft comprising:
   a plate connected to said shaft having a tang for each hollow blade; and,
   first clamping means connected to said plate having a surface that conforms to the surface of said tang and a surface that conforms to the outside surface near the leading edge of the hollow blade; and,
   a first insert in said blade, and
   connecting means passing through the leading edge of the blade for connecting the first insert to said clamping means; and,
   a second clamping means having a surface that conforms to the surface of said tang and a surface that conforms to the outside surface of the blade near the trailing edge of the blade; and,
   a second insert in the blade; and
   further connecting means passing through the trailing edge of the blade for connecting said clamping means to the second insert.

* * * * *